May 15, 1962 — C. T. BREITENSTEIN — 3,034,790
SELECTIVELY CHANGEABLE SCORE INDICATING AND DISPLAY MEANS
Filed March 12, 1956 — 3 Sheets-Sheet 1

Inventor:
Charles T. Breitenstein
By [signature]
Atty.

May 15, 1962   C. T. BREITENSTEIN   3,034,790
SELECTIVELY CHANGEABLE SCORE INDICATING AND DISPLAY MEANS
Filed March 12, 1956   3 Sheets-Sheet 2

Inventor:
Charles T. Breitenstein
By
Atty.

May 15, 1962　　　C. T. BREITENSTEIN　　　3,034,790
SELECTIVELY CHANGEABLE SCORE INDICATING AND DISPLAY MEANS
Filed March 12, 1956　　　　　　　　　　　3 Sheets-Sheet 3

Inventor:
Charles T. Breitenstein
By ⟨signature⟩
Atty.

United States Patent Office 3,034,790
Patented May 15, 1962

3,034,790
SELECTIVELY CHANGEABLE SCORE INDICATING AND DISPLAY MEANS
Charles T. Breitenstein, Chicago, Ill., assignor to Raymond T. Moloney, Chicago, Ill.; American National Bank and Trust Company of Chicago, executor of Raymond T. Moloney, deceased
Filed Mar. 12, 1956, Ser. No. 570,931
9 Claims. (Cl. 273—118)

This invention pertains to changeable number exhibiting, totalizing, and annunciator devices, and has as its principal object the provision of a novel selective score-display and indicating mechanism of general utility but particularly adapted to use in ball-rolling and like amusement games.

In some of its more detailed aspects, the disclosed display mechanism provides a set of rotatable carriers and sub-carriers with a single motor means for simultaneously rotating the same in a planetary system, together with means for selectively indexing certain primary carriers automatically in a stopping position in which individual sub-carriers display numbers in uniform reading positions and patterns relative to certain fixed numbers.

In another of its aspects of novelty, the improved display device affords a plurality of primary indicia carriers and certain biased sub-carriers arranged in a planetary system for selective angular travel about a common center by a common motor drive means, such that numbers or other indicia displayed on the sub-carriers can be changed rapidly by successive energization of the selective index means.

More detailed objects, advantages, and aspects of novelty and utility inherent in the disclosed improvements will be pointed out hereinafter in the appended claims and the specification of a preferred embodiment of the invention as disclosed in view of the annexed drawings in which:

Figure 1:
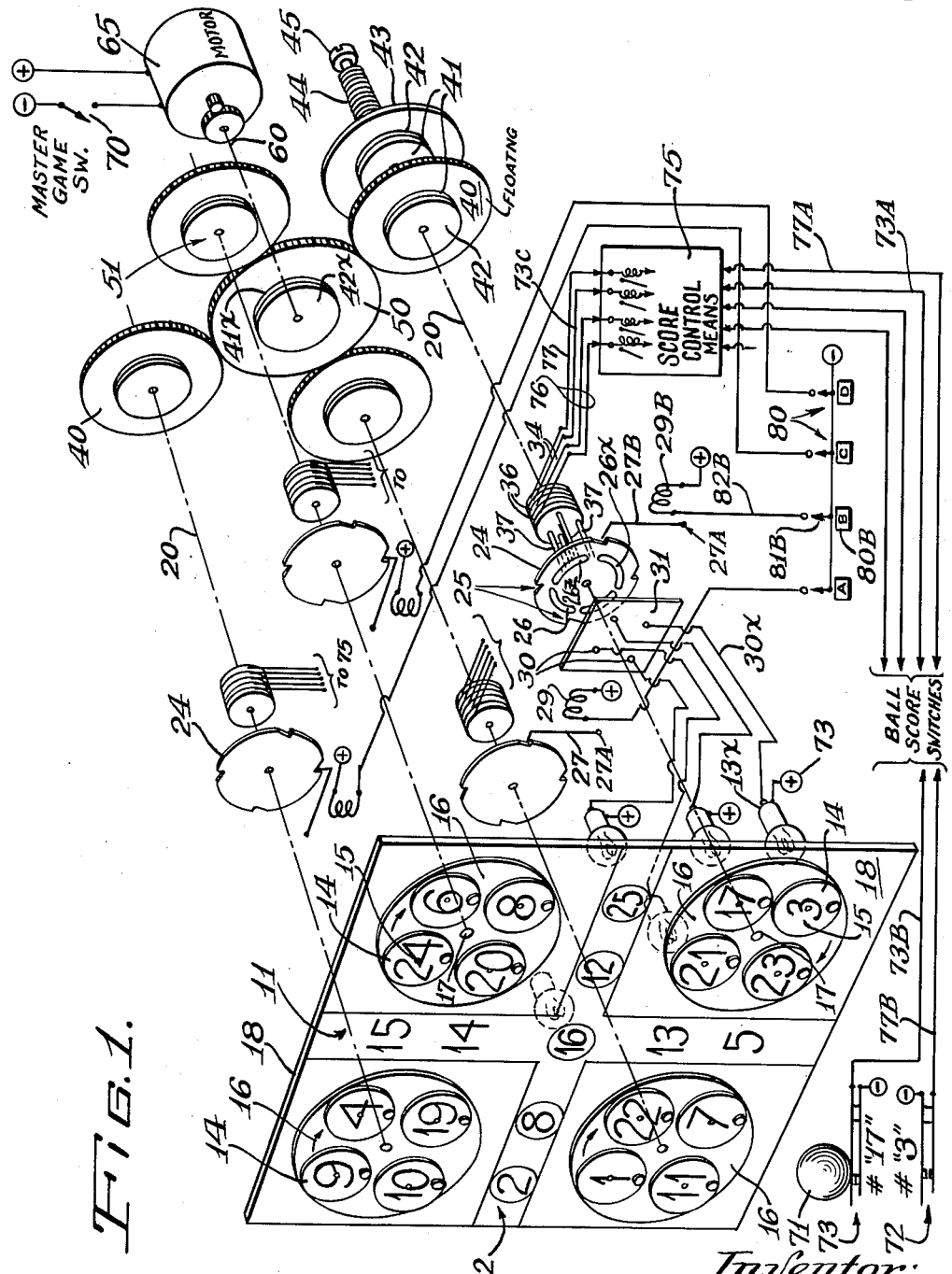
FIG. 1 is an exploded functional schematic and circuit diagram showing in perspective certain features of one of the novel number display units.

In the embodiment chosen for illustration in FIG. 1, the changeable score device is employed in conjunction with a game score display panel adapted for use in a game such as Bingo, wherein the score "card" consists of a square array of five numbers across five columns so that there are five horizontal lines containing five numbers each, and five intersecting vertical columns likewise containing five numbers each.

The panel 10 in FIG. 1 affords an array of numbers such as just described, there being a fixed central vertical column 11 and a central horizontal line 12 each including five numbers with the central number "16" shared by both columns. These numbers are, in practice, delineated in translucent colors on glass and will be individually illuminated by small electric lamps 13 situated behind the panel in the well-known manner when such lamps are energized by scoring circuits involved in playing the game. It is understood that there will be a lamp 13 associated with each number, whether fixed or movable.

The remaining numbers of the array associated with the panel 10 are not fixed, but are delineated on small translucent sub-carrier discs 14 of plastic material each pivotally mounted as at 15 on a larger primary carrier disc 16 which is also of translucent plastic and which, in turn, is rotatably mounted as at 17 on a supporting shaft 20 extending through a panel 18.

Fixed on each shaft 20 is an index or brake disc 24 having peripheral indexing notches 25 equivalent in number and angular position to the number of sub-carrier number discs 14 on the appertaining primary disc.

Figure 7:
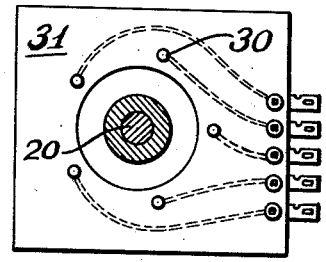
FIG. 7 is a vertical sectional detail through one of the individual primary carrier shafts showing in rear elevation the appertaining commutating-switch panel.

On the inside face of the index discs are rotary wiper contacts 26 (FIG. 8 also) engageable with score contacts 30 (FIG. 7 also) on an associated stationary contact panel 31. Circuit connection to these wipers is established through spring contact brush wires 34 riding on contact rings 36, which in turn are interconnected with corresponding rotary wipers by jumper pins 37.

Figure 2:
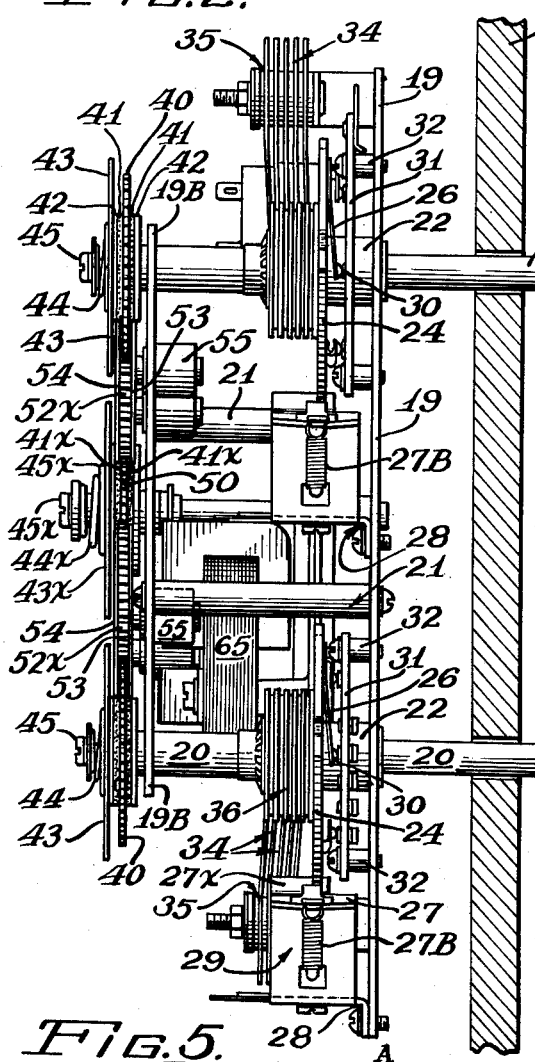
FIG. 2 is a side elevation of one of the number display units with parts shown in section.

Floating freely on a reduced end portion of each shaft 20 is a driving planetary gear 40 meshing (in the schematic arrangement of FIG. 1) with a centrally disposed master driving gear 50 driven from shaft 60 by motor 65 through a slip clutch means generally indicated at 51 and substantially identical to that now to be described for the various individually driven planetary gears 40, which are each flanked by friction discs 41 (of rubber, leather, or like clutch facing) and drive washers 42, there being a large metal disc 43 pressing the entire clutch disc assembly together to somewhat squeeze the planetary gears 40 between their clutch members as a result of the pressure of corresponding clutch springs 44. The actual assembly of these clutch parts on shafts 20 is depicted in FIG. 2, the springs 44 and presser plates 43 being seen also in the rear view of FIG. 6.

When the motor 65 is running, all gears will be rotated, but the shafts 20 will not rotate unless their respective index clutches are released, there being (FIG. 1) associated with each index disc 24 an armature pawl 27 pivoted as at 27A for attraction by a coil 29 from normal indexing or braking position in which the end of the pawl is engaged in a notch 25 on the associated index disc and exerts sufficient restraint on the shaft 20 to prevent rotation thereof, and hence of the associated primary number-carrying disc 16, notwithstanding the driving effort of the motor.

When any index coil 29 is energized, the appertaining index pawl or armature brake 27 will be attracted from said normal position to free the disc 24, and thereupon the frictional action of the slip clutch means 41–44 will cause shaft 20 to turn and with it the associated primary number carrier 16, as a result of which the set of four appertaining sub-carrier discs 14 will be carried around to successively new positions.

In the illustrative embodiment, each index disc is provided with four index notches 25 spaced at angularly equal distances thereabout so as to stop or index the corresponding shaft 20, and hence its primary carrier 16 at predetermined quadrantal positions, so that the primary carriers will always be stopped with the appertaining sub-carrier number discs 14 each disposed in one of said quadrantal positions with the numbers displayed lying respectively in two vertical and two horizontal lines, and therefore in alignment with the corresponding horizontal and vertical lines of the square array of numbers on the so-called Bingo score "card" arrangement heretofore mentioned.

Figure 3:
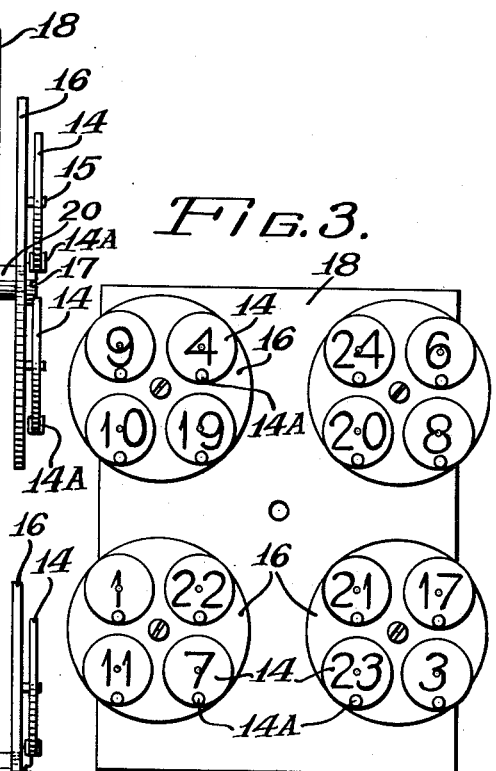
FIG. 3 is a front elevation to reduced scale of a set of planetary number carriers in one display unit.
Figure 4:
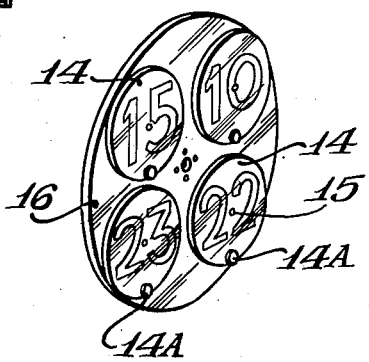
FIG. 4 is a perspective detail of one of the primary carriers.

In order that the shiftable or changeable numbers shall always come to rest aligned in proper reading positions, as aforesaid, each sub-carrier number disc 14 (as in FIGS. 3 and 4) is biased, preferably by means of a small plug weight 14A of sufficient mass to serve as a pendulum bob so that the sub-carrier discs always maintain an upright reading position. Thus, in whatever position the carriers may be stopped, the individual numbers will all stand in proper reading alignment relative to each other and the fixed numbers in the array (as in FIG. 1); and in this connection, it is of interest to observe that the individual number discs or sub-carriers 14 are freely rotatable, and the motor drive is geared down for relatively slow-motion, so that the number changes occurring as a result of release of the clutches when the motor is running, are smooth, and by the time the primary discs come to rest, the individual number discs are already in reading position and do not oscillate, owing to the stabilizing action of the biasing weights and the fact that the angular transpositioning of these smaller discs begins the instant the main carrier starts to move; in other words, the relative change of angular motion of the carriers and their respective number discs in each set is simultaneous and synchronous, and there is no jerking or swinging of the numbers when the carriers are stopped by the indexing means.

Figure 6:
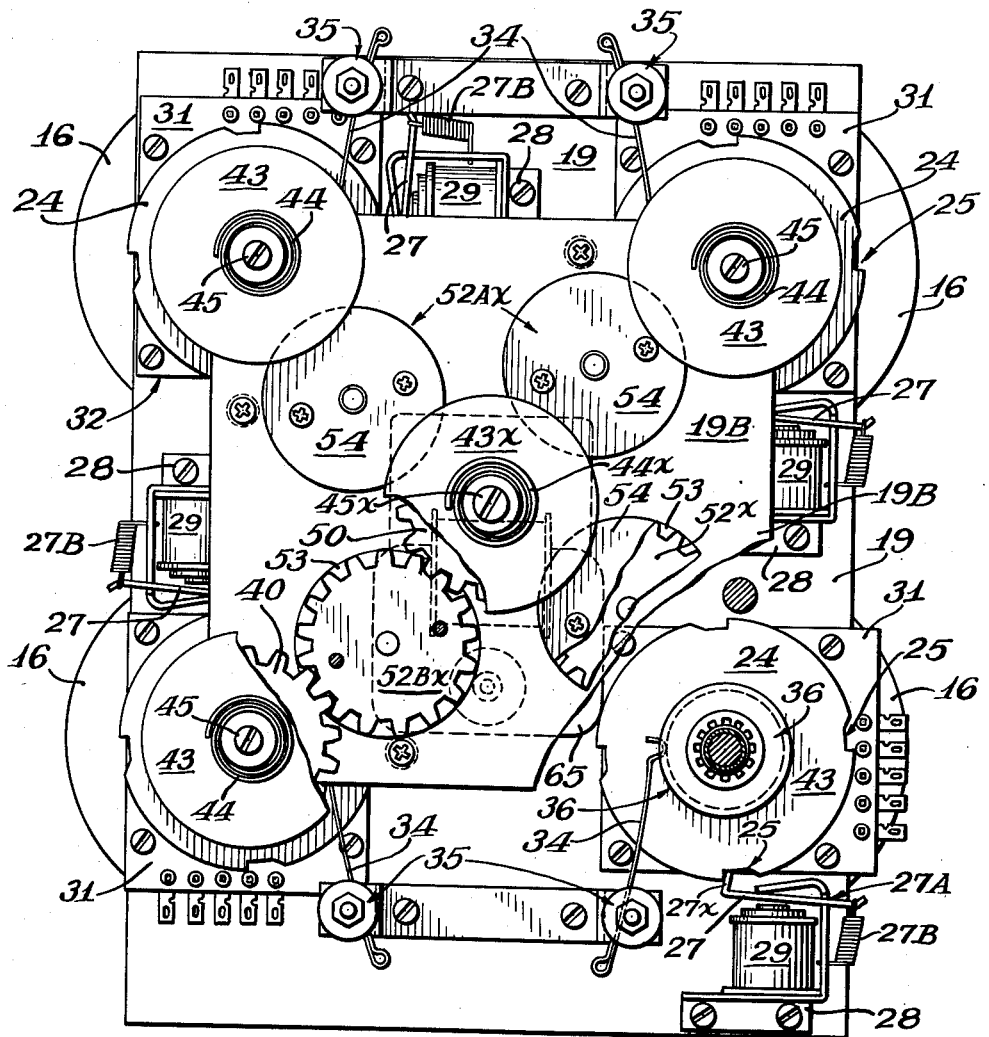
FIG. 6 is a rear elevation of the display mechanism shown in FIG. 2.

The novel selective display mechanism has been constructed as a compact unit, such as depicted in FIGS. 2 and 6, the former being now referred to as most analogous to the schematic of FIG. 1, said unit comprising a heavy metal base plate 19 and a smaller back plate 19B carried by the former by bolt-and-spacing-stud means 21.

The carrier shafts 20 are journalled in heavy bushings 22 seated in the front plate 19 (FIG. 2), the rearward portions of these shafts having no bearings except as afforded by the support of the rear plate 19B.

On the inside face of the main base plate, the several contact panels 31 are supported by spacer studs 32 with the corresponding shafts 20 passing therethrough and the appertaining index discs 24 fixed close thereto so that wipers 26 press against the panels to engage the contacts 30 thereon.

Figure 8:
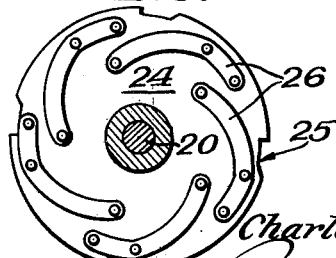
FIG. 8 is a section taken as in FIG. 7 looking oppositely at the appertaining index and contact wiper disc which cooperates with the panel of FIG. 7.

The assembly of contact commutator rings and insulating spacers 36 is fitted close against the corresponding index disc, and conductive jumper pins (e.g. 37, FIG. 1) project in bores within the assembly of discs to connect the commutator rings with the several contact wipers on the index disc as indicated at 26 in FIG. 8.

As viewed at the bottom of FIGS. 2 and 6, the several commutator brushes 34 are carried on insulating posts 35 bolted to the base plate 19.

The slip clutches are positioned at the outside face of the rear or smaller base plate 19B with the compact friction discs 41 and 42 pressing oppositely against the corresponding gears 40 through the agency of the large metal presser discs 43 and springs 44, tensioned by the header screws 45 threaded into the outer ends of the shafts 20, it being recalled that these outer ends are reduced and the gears 40 float freely thereon except as they drive the shafts 20 through the slip clutches when the index brakes are withdrawn.

The coils 29 for the index brake means are of the relay-type construction with the brake-pawl armatures 27 rocking on the core frames as at 27A, FIG. 6, and normally urged into disc-engaging position by individual springs 27B, each said armature having an offset end 27X projecting to engage in the notches 25. Each brake or index coil assembly is mounted on the main base plate by bracket means 28, the positions of two of these units being turned for convenient access to the appertaining index discs in the confined space available.

In the schematic arrangement depicted in FIG. 1, the planetary gear system omits for simplification certain intermediate gears 52X which are employed in the actual construction (FIG. 6), these gears being journalled in bushings 55 on the back plate and being of an economical construction in that they are stamped from thin metal stock and are flanked on opposite faces by thin metal guard discs 53, 54 of slightly larger diameter so that the meshing gears on shafts 20 will not get out of mesh. In FIG. 6 the two upper intermediates 52AX are shown with their outer guard discs 54 in position, while the lower gear 52BX appears with its outer guard disc removed entirely, and the remaining intermediate gear 52X has its outer guard disc 54 partially broken away.

An additional safety margin is supplied by having the main driving gear impositively driven through a slip clutch means constructed exactly in the manner of that of the driven-gear clutch means 41, 42, 43, 44, 45, heretofore described, the outside presser plate or disc 43X and appertaining presser spring 44X of the main clutch being apparent on driving gear 50 in both FIGS. 2 and 6.

Illustrative circuit connections are shown in FIG. 1 for selectively actuating the novel score display means; and in one mode of operation the motor 65 is caused to run continuously during operation of the game as a result of automatic closure of a Master Game Switch 70 under control of certain additional master game control circuits (not illustrated) which are well known for conditioning such games for a round of play.

In consequence of such running of the motor, all of the driven gears 40, 50 (FIG. 1) and 40, 50, 52 (FIG. 6) will likewise be continuously rotating; but in the normal condition of the score display means, none of the clutch or brake coils 29 will be energized, and therefore all index discs 24 will be held by their pawls 27 against rotation, the several slip-clutch assemblies 41–43 permitting such restraint of the discs and their shafts, so that all number carriers 16 normally remain at rest.

The lamps 13 in general are illuminated as a result of playing the game, particularly by playing a ball 71 (lower left FIG. 1) so as to close certain corresponding switches such as ball switch 72 connected, as by conductor 77B, to cause energization of a particular score lamp 13X, at this time associated with the numeral "3" lying in the fourth quadrant on the carrier for the lower right-hand "card" area in FIG. 1.

Let it be assumed for illustration that in the condition of things shown in FIG. 1, the Score Control Means 75 connects via a particular conductor 77 and one of the commutator brushes 34 to a particular spring wiper contact 26X, thus completing via conductor 30X a particular score circuit for lamp 13X, which at present happens to correspond to the score numeral "3" and which also includes in connection therewith via conductors 77A, 77B, the ball switch 72; but the player in this instance does not favor the existing score possibilities which include the score numeral "3," and he therefore decides to exercise his option to change it.

Figure 5:
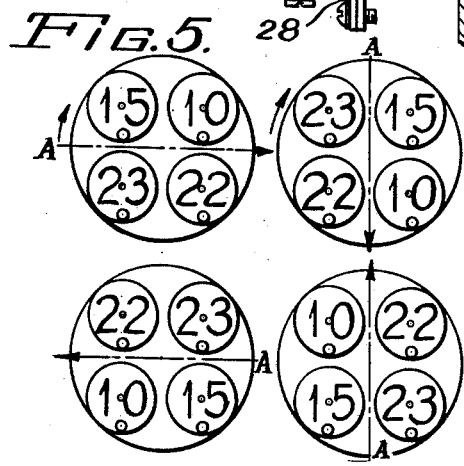
FIG. 5 is an operating diagram for illustrating the motions of individual sub-carriers.

Accordingly, the player may push the selector switch button 80B and close selector switch 81B to apply power via conductor 82B to the particular clutch coil 29B associated with the carrier bearing said score number, whereupon the clutch pawl 27B thereof will be attracted, free the index disc from restraint, and the appertaining carrier 16 will begin to turn at a moderately slow speed and continue to do so until the selector switch 81B is permitted to open again by the player, who may hold down the corresponding operating button 80B as long as he chooses. The successive transpositions of a set of carrier numbers are illustrated in the diagram of FIG. 5. The rate of travel of the primary carrier is leisurely enough to permit the player to see a number come into position and to decide whether he should stop it or await one of the succeeding numbers on any particular carrier. The moment any clutch coil 29 is deenergized, the associated pawl will drop back and enter the first index notch 25 presented to it, stopping the disc at once.

Having stopped the carrier with the numeral "17" standing before lamp 13X, a new score circuit is required to disconnect the former ball switch 72 and substitute a different ball switch 73 which is assigned to the number "17." This function is performed by the commutating switch means 34, 26, 30, and the score control means 75, ball switch 73 now being connected via conductors 73B, 73A, control means 75, conductor 73C, a brush 34, wiper spring 26Z (turned into the place of former wiper 26X), and conductor 30X again to lamp 13X. The circuit connections for the remaining carrier units and appertaining lamps are similar and are therefore omitted to simplify the diagrammatic illustration.

Selective operation of any of the other three primary carriers is similarly effected by actuation of one of the other selector switch buttons 80A–D resulting in identical operations of the appertaining clutch, index means, and carriers.

It will be understood that the foregoing examples of operation are intended to be illustrative and not limiting, and that a great variety of additional scoring arrangements are made possible by the score-changing and indicating means disclosed.

I claim:

1. In a ball-rolling game, changeable score means comprising a plurality of primary carriers in the form of discs mounted to rotate close to a common vertical plane with their respective rotative axes situated about a common center; a driving motor; a gear system common to said motor and primary carriers; electromagnetically controllable clutch means drivingly interconnecting each one of said primary carriers with said gear system; selectively operable switch means connected in circuit for actuating any clutch means to effect rotation of a desired primary carrier; a plurality of individually rotatable subcarriers arranged on each primary carrier to turn about axes parallel to the rotative axis of such carrier in a plane parallel to said first-mentioned plane; means operatively associated with each subcarrier for biasing the same at all times into a certain angular reading position with respect to a vertical axis through the individual rotative axis thereof, whether the appertaining primary carrier be at rest or in motion; and score indicia carried on each subcarrier in a reading position oriented relative to said certain reading position so as to be all readable regardless of the rotated positions of the primary carriers; together with individual lamp means for illuminating each subcarrier and corresponding ball-operated score switches and circuit means connected therewith for ball operation to selectively control illumination of the subcarriers.

2. The combination of claim 1 further characterized in that each of said ball-operated switches is associated with a certain score indicium on a particular subcarrier; and commutator switch means including movable contact means travelling in step with each primary carrier, and relatively stationary cooperating contact means interposed in the said circuit means connecting each of the ball-operated switches with their corresponding lamps, whereby the lamp circuits are changed automatically and interconnected with their corresponding ball-operated switches in any of the positions of the subcarriers.

3. A changeable score board device of the type exhibiting indicia in intersecting vertical and horizontal columns, said device comprising: a rotatable primary carrier; four subcarriers mounted on the primary carrier to rotate individually in a planetary relation about axes equally spaced from each other and concentric to the rotative axis of the primary carrier; means mounting the primary carrier to rotate in a substantially vertical plane; electric motor means and score switches connected to control the same for turning the primary carrier successively into predetermined quadrantal positions; and means carried by each subcarrier for eccentrically biasing the mass thereof so as to maintain each of the same in substantially one angular reading position, relative to a vertical axis normal to its rotative axis under all conditions of rest or rotation of the primary carrier, whereby the subcarriers all tend to stand in one upright reading position whilst being transposed from one of said quadrantal positions to another responsive to turning of the primary carrier, said subcarriers having score indicia delineated and oriented thereon for reading in said upright reading position, and each of the said quadrantal positions disposing each of the subcarriers with the respective score indicia thereof situated in said reading position in one of the vertical or horizontal columns aforesaid.

4. For a ball-rolling game, score indicating mechanism including: rotatable primary carriers arranged to turn in a plane about a common center; subcarriers on each primary carrier and each having score indicia thereon and each mounted to turn in a plane upon, and parallel to the face of, the corresponding primary carrier and about individual axes equally spaced from each other and from the turning axis of the appertaining primary carrier; means urging each subcarrier into one certain angular reading position on its own primary carrier in all angular positions of the latter, whether at rest or in motion, the said angular positions of all subcarriers on any one primary carrier being relatively the same when measured with respect to the axis of such primary carrier, whereby all subcarriers tend to remain at all times in predetermined angular reading orientation; means including an electric motor and clutch drive means interconnecting each primary carrier independently therewith for selectively turning any primary carrier to dispose any of its subcarriers in any one of a plurality of predetermined reading locations corresponding in total number to the total number of subcarriers thereon, whereby the score indicia on the several subcarriers may be transposed to appear in reading condition in different ones of said reading locations.

5. A changeable number and like indicia-displaying mechanism comprising a plurality of shafts; motor means for turning said shafts; a primary carrier rotated by each shaft and each in a position concentric with a common center and in a substantially vertical plane; sub-carriers pivotally supported on each primary carrier for free rotation about centers which are concentric to the axis of rotation of the appertaining primary carrier, said sub-carriers being adapted to have indicia displayed thereon; and means on said sub-carriers pivotally biasing the same into substantially upright reading positions at all times, and particularly during angular travel of said primary carrier responsive to turning of the appertaining shaft; and impositive drive means yieldingly coupling each said shaft with said motor means, a notched index member rotatable by each shaft, and indexing pawl means movable to engage and disengage notched portions of a corresponding index member operatively associated therewith for freeing or restraining a corresponding primary carrier in rotation; the notched parts of the index members being located to stop the corresponding primary carriers with their appertaining sub-carriers in predetermined quadrantal display locations.

6. In an amusement apparatus a bingo card having certain stationary score indicia thereon and a carrier rotatable in a reading plane with respect to said stationary indicia with individually rotatable subcarriers each having score indicia thereon and respectively located in a quadrant of the carrier and each biased to stand in a constantly upright reading position with respect to said plane during rotation of the carrier for columnar reading alignment respectively with certain of said stationary indicia on said card in any quadrantal position; motor means and electrically controlled drive mechanism actuated thereby for rotating said carrier; and control circuit means connected for operation to actuate the drive mechanism, start the carrier and stop the same selectively in any quadrantal position.

7. Apparatus according to claim 6 further characterized by the provision of a plurality of game-operated switches and electric lamps positioned to illuminate corresponding stationary and movable indicia characters individually, and commutating switch means connecting with said lamps and certain appertaining game switches selectively operable to illuminate at least the lamps associated with the movable indicia on the subcarriers.

8. Apparatus according to claim 6 further characterized by the provision of a plurality of game-operated switches and electric lamps respectively positioned to illuminate corresponding stationary and movable indicia characters, and commutating switch means connecting with said lamps and certain appertaining game switches and selectively operable to illuminate at least the lamps associated with the movable indicia on the subcarriers.

9. In a bingo type game apparatus, a mechanized bingo game card comprising: means defining stationary score indicia arranged in a reading plane in a fixed central vertical column and an intersecting fixed central horizontal column to form a cross dividing the card into four reading quadrants; a rotatable carrier disposed in each quadrant to be read in said plane, each carrier having four rotatable sub-carriers arranged to rotate about axes radial to the rotative axis of the carrier, each sub-carrier lying along axes of alignment with the stationary indicia in said fixed columns, said sub-carriers each having score indicia thereon, thereby aligned with the stationary indicia to be read in said plane when the carriers and sub-carriers are at rest with all indicia aligned in an array of Cartesian co-ordinates to define a bingo type of score cards; means for maintaining each sub-carrier in an upright indicia-reading condition while its carrier is rotated, whereby all sub-carrier indicia are at all times maintained in upright reading relation with the stationary indicia; means for rotatively displacing any carrier predetermined angular amounts to change the positions of the sub-carriers thereof and alter the display of indicia in at least two vertical and two horizontal columnar components of the appertaining quadrant in the card for each said predetermined displacement of any carrier.

References Cited in the file of this patent

UNITED STATES PATENTS

| | | |
|---|---|---|
| 377,925 | Briggs | Feb. 14, 1888 |
| 911,618 | Schutz | Feb. 9, 1909 |
| 1,684,534 | Campbell | Sept. 18, 1928 |
| 2,211,617 | Faber | Aug. 13, 1940 |
| 2,618,486 | Durant | Nov. 18, 1952 |
| 2,629,475 | Hooker | Feb. 24, 1953 |
| 2,727,743 | Von Stoeser | Dec. 20, 1955 |
| 2,882,056 | Hooker | Apr. 14, 1959 |
| 2,932,517 | Hooker et al. | Apr. 12, 1960 |

FOREIGN PATENTS

| | | |
|---|---|---|
| 2,945 | Great Britain | of 1903 |